(12) United States Patent
Bannari

(10) Patent No.: US 9,938,896 B2
(45) Date of Patent: Apr. 10, 2018

(54) COMPRESSED AIR ENERGY STORAGE AND RECOVERY

(71) Applicant: SIGMA ENERGY STORAGE INC., Saint-Bruno-de-Montarville (CA)

(72) Inventor: Abdelfettah Bannari, Sherbrooke (CA)

(73) Assignee: Sigma Energy Storage Inc., Dorval, QC (CA)

( * ) Notice: Subject to any disclaimer, the term of this patent is extended or adjusted under 35 U.S.C. 154(b) by 59 days.

(21) Appl. No.: 14/674,952

(22) Filed: Mar. 31, 2015

(65) Prior Publication Data

US 2015/0267612 A1   Sep. 24, 2015

Related U.S. Application Data

(63) Continuation-in-part of application No. PCT/CA2014/000294, filed on Mar. 31, 2014.

(Continued)

(51) Int. Cl.

| | |
|---|---|
| *F02C 6/16* | (2006.01) |
| *F01D 15/10* | (2006.01) |
| *F01K 3/00* | (2006.01) |
| *F28F 21/08* | (2006.01) |
| *F01D 15/02* | (2006.01) |

(Continued)

(52) U.S. Cl.
CPC ............. *F02C 6/16* (2013.01); *F01D 15/02* (2013.01); *F01D 15/10* (2013.01); *F01K 3/00* (2013.01); *F04B 41/02* (2013.01); *F28D 7/16* (2013.01); *F28F 21/083* (2013.01);

(Continued)

(58) Field of Classification Search
CPC .......... F02C 6/16; Y02E 60/15; F28D 20/025; F28D 1/05333; F28F 21/083; F28F 2260/00

See application file for complete search history.

(56) References Cited

U.S. PATENT DOCUMENTS

| 1,887,618 A | 11/1932 | Thomas |
| 3,677,008 A * | 7/1972 | Koutz .................... F02C 6/16 |
| | | 290/52 |

(Continued)

FOREIGN PATENT DOCUMENTS

| CN | 101285664 A | 10/2008 |
| EP | 2574756 A1 | 4/2013 |

(Continued)

OTHER PUBLICATIONS

PCT/CA2014/000294 international preliminary report with related claims.

(Continued)

*Primary Examiner* — Mark Laurenzi
*Assistant Examiner* — Xiaoting Hu
(74) *Attorney, Agent, or Firm* — Anglehart et al.

(57) ABSTRACT

A compressed air system energy storage and recovery system has a compressed air tank structured to store compressed air above 200 bars, a heat storage unit containing a heat transfer fluid and having a latent heat storage material, and a heat exchanger. The heat exchanger extracts heat from compressed ambient air above 200 bars for storage and to heat compressed air from the tank above 200 bars prior to expansion and use to recover energy in the air motor. Efficiency of energy storage and heat exchange is improved using pressures above 200 bars.

17 Claims, 12 Drawing Sheets

Related U.S. Application Data

(60) Provisional application No. 61/807,914, filed on Apr. 3, 2013.

(51) Int. Cl.
*F04B 41/02* (2006.01)
*F28D 7/16* (2006.01)
*F28D 20/00* (2006.01)

(52) U.S. Cl.
CPC .. *F28D 2020/0047* (2013.01); *F28F 2260/00* (2013.01); *Y02E 60/15* (2013.01)

(56) References Cited

U.S. PATENT DOCUMENTS

| | | |
|---|---|---|
| 4,100,745 A | 7/1978 | Gyarmathy |
| 4,127,161 A * | 11/1978 | Clyne .................. F28D 20/02 126/400 |
| 4,148,744 A | 4/1979 | Hunt et al. |
| 4,150,547 A | 4/1979 | Hobson |
| 4,153,047 A | 5/1979 | Dumbeck |
| 4,286,141 A | 8/1981 | MacCracken |
| 4,287,076 A | 9/1981 | Babin et al. |
| 4,371,028 A | 2/1983 | Helshoj |
| 4,400,286 A | 8/1983 | Schaper et al. |
| 4,421,663 A | 12/1983 | Embree et al. |
| 4,765,142 A | 8/1988 | Nakhamkin |
| 4,911,232 A * | 3/1990 | Colvin .................. F28D 19/00 165/10 |
| 5,007,478 A | 4/1991 | Sengupta |
| 5,491,969 A | 2/1996 | Cohn et al. |
| 5,558,802 A | 9/1996 | Dowling |
| 5,687,706 A | 11/1997 | Goswami et al. |
| 5,845,479 A * | 12/1998 | Nakhamkin .............. F02C 6/16 60/727 |
| 5,965,498 A | 10/1999 | Smythe |
| 6,063,312 A | 5/2000 | Mannheimer |
| 7,086,231 B2 | 8/2006 | Pinkerton |
| 7,886,809 B2 | 2/2011 | Searls et al. |
| 7,954,321 B2 | 6/2011 | Shinnar |
| 8,234,862 B2 | 8/2012 | McBride et al. |
| 8,261,552 B2 | 9/2012 | Nakhamkin |
| 8,347,628 B2 | 1/2013 | Gerard |
| 2004/0148922 A1* | 8/2004 | Pinkerton ................ F02C 1/05 60/39.6 |
| 2005/0092475 A1* | 5/2005 | Ambros .................... F01P 7/14 165/177 |
| 2005/0139802 A1 | 6/2005 | Maes et al. |
| 2005/0188689 A1* | 9/2005 | Juby ..................... F01C 1/02 60/413 |
| 2006/0076426 A1* | 4/2006 | Schuetze ................. G05D 27/02 237/12 |
| 2007/0101712 A1* | 5/2007 | Negre ..................... F01B 17/02 60/517 |
| 2007/0158611 A1* | 7/2007 | Oldenburg ............ B22F 1/0025 252/71 |
| 2007/0220889 A1 | 9/2007 | Nayef et al. |
| 2010/0006798 A1 | 1/2010 | Endo |
| 2010/0251712 A1* | 10/2010 | Nakhamkin ............... F01K 3/12 60/659 |
| 2011/0100010 A1* | 5/2011 | Freund .................... F02C 1/005 60/659 |
| 2011/0100213 A1* | 5/2011 | Finkenrath ................ F02C 1/02 95/92 |
| 2011/0100583 A1 | 5/2011 | Freund et al. |
| 2011/0120673 A1 | 5/2011 | Xiang et al. |
| 2011/0127004 A1* | 6/2011 | Freund ..................... F02C 6/16 165/45 |
| 2011/0179807 A1 | 7/2011 | Holloway et al. |
| 2011/0196542 A1 | 8/2011 | Pinkerton et al. |
| 2011/0258996 A1 | 10/2011 | Ingersoll et al. |
| 2012/0036853 A1* | 2/2012 | Kidd ........................ F02C 1/04 60/659 |
| 2012/0102987 A1* | 5/2012 | Anikhindi ................ F02C 6/16 62/93 |
| 2012/0286522 A1 | 11/2012 | Stahlkopf et al. |
| 2013/0049268 A1 | 2/2013 | Kaufmann et al. |
| 2013/0061591 A1 | 3/2013 | Bove et al. |
| 2013/0192216 A1* | 8/2013 | Berlin, Jr. ................ F02C 6/16 60/327 |
| 2014/0138160 A1 | 5/2014 | Howard et al. |
| 2014/0366536 A1 | 12/2014 | Muren |
| 2015/0298267 A1* | 10/2015 | Rigal ....................... F28F 3/12 165/164 |

FOREIGN PATENT DOCUMENTS

| | | |
|---|---|---|
| EP | 2581584 A1 | 4/2013 |
| JP | H08-60141 A | 3/1996 |
| JP | H07-26252 A | 11/2001 |
| WO | WO 01/90273 A2 | 11/2001 |
| WO | WO 2009/101398 A1 | 8/2009 |
| WO | WO 2010/125568 A2 | 11/2010 |
| WO | WO 2011/076926 A2 | 6/2011 |
| WO | WO 2011/079267 A1 | 6/2011 |
| WO | WO 2013/003192 A1 | 1/2013 |
| WO | WO 2013/070572 A1 | 5/2013 |
| WO | WO 2013-087949 A1 | 6/2013 |
| WO | WO 2013150458 A1 * | 10/2013 ............... F28F 3/12 |

OTHER PUBLICATIONS

PCT/CA2015/050227 International search report with related claims.
PCT/CA2015/050227 Written Opinion.
PCT/CA2014/000294 International search report with claims.
PCT/CA2014/000294 search notes.
PCT/CA2014/000294 written opinion.

* cited by examiner

Total Heat Exchanger and Storage Vessel Cost for 1MWh

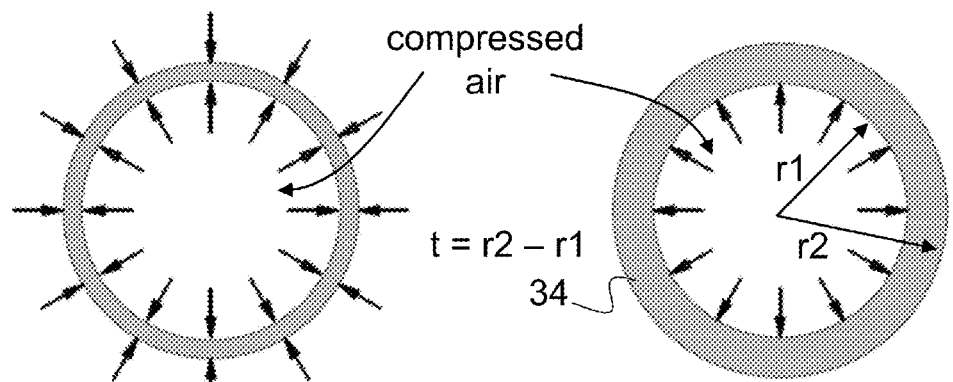
Figure 4A       Figure 4B
Figure 4C
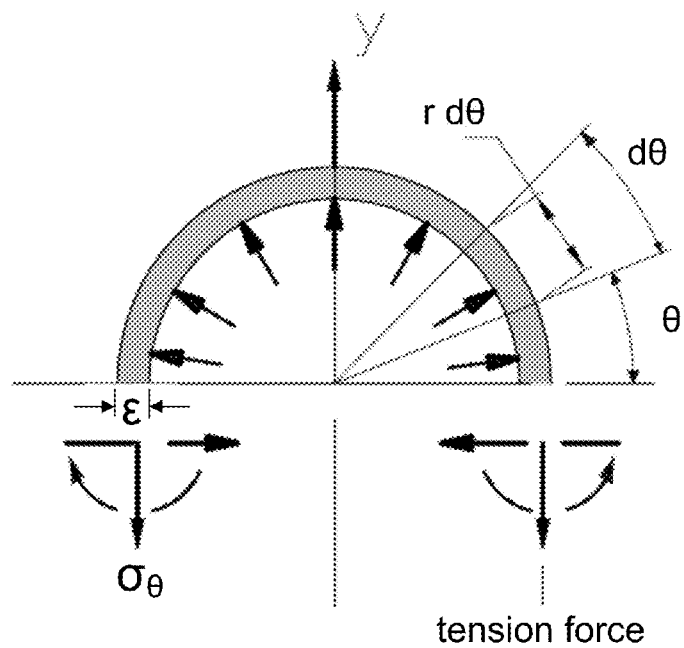

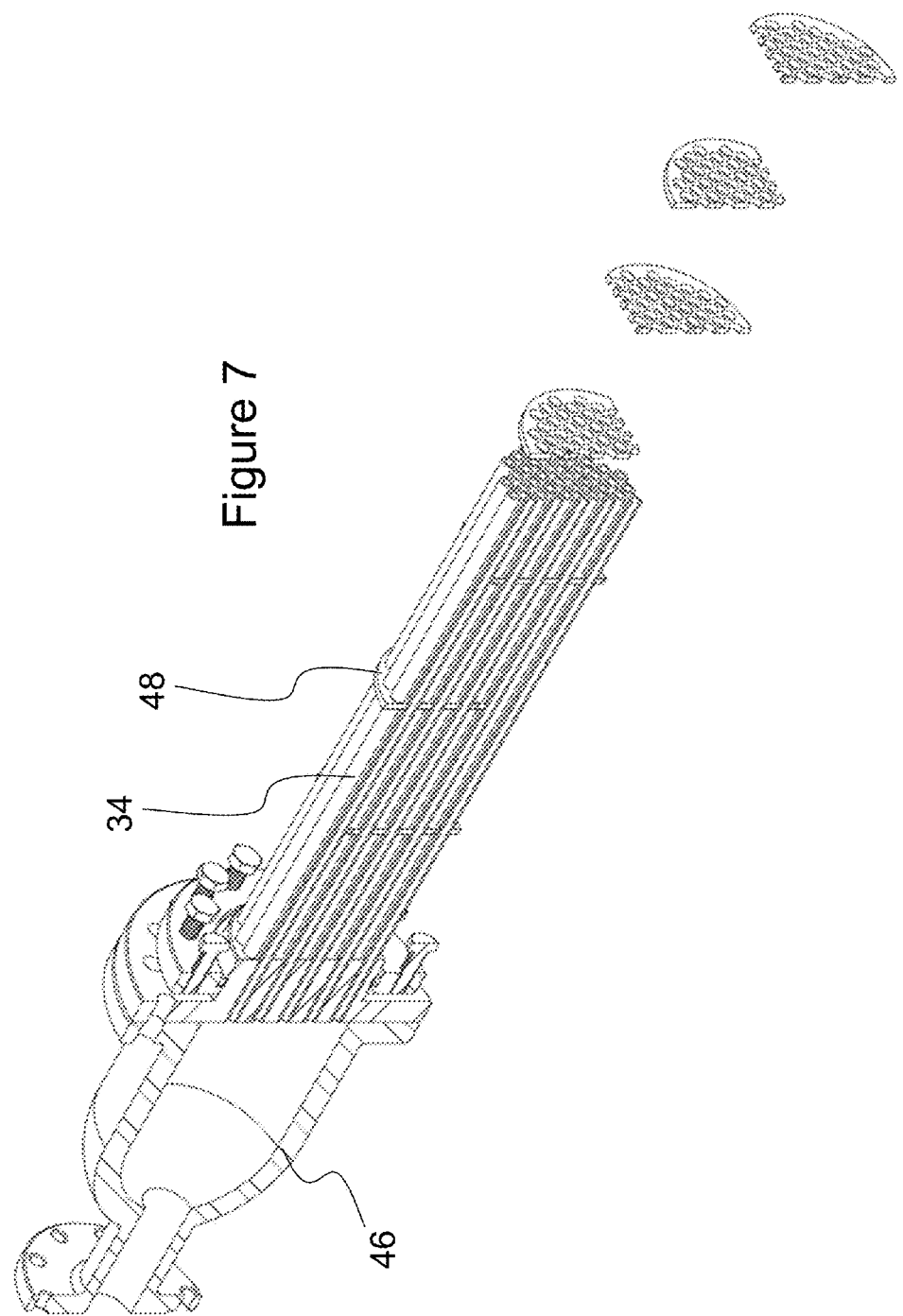

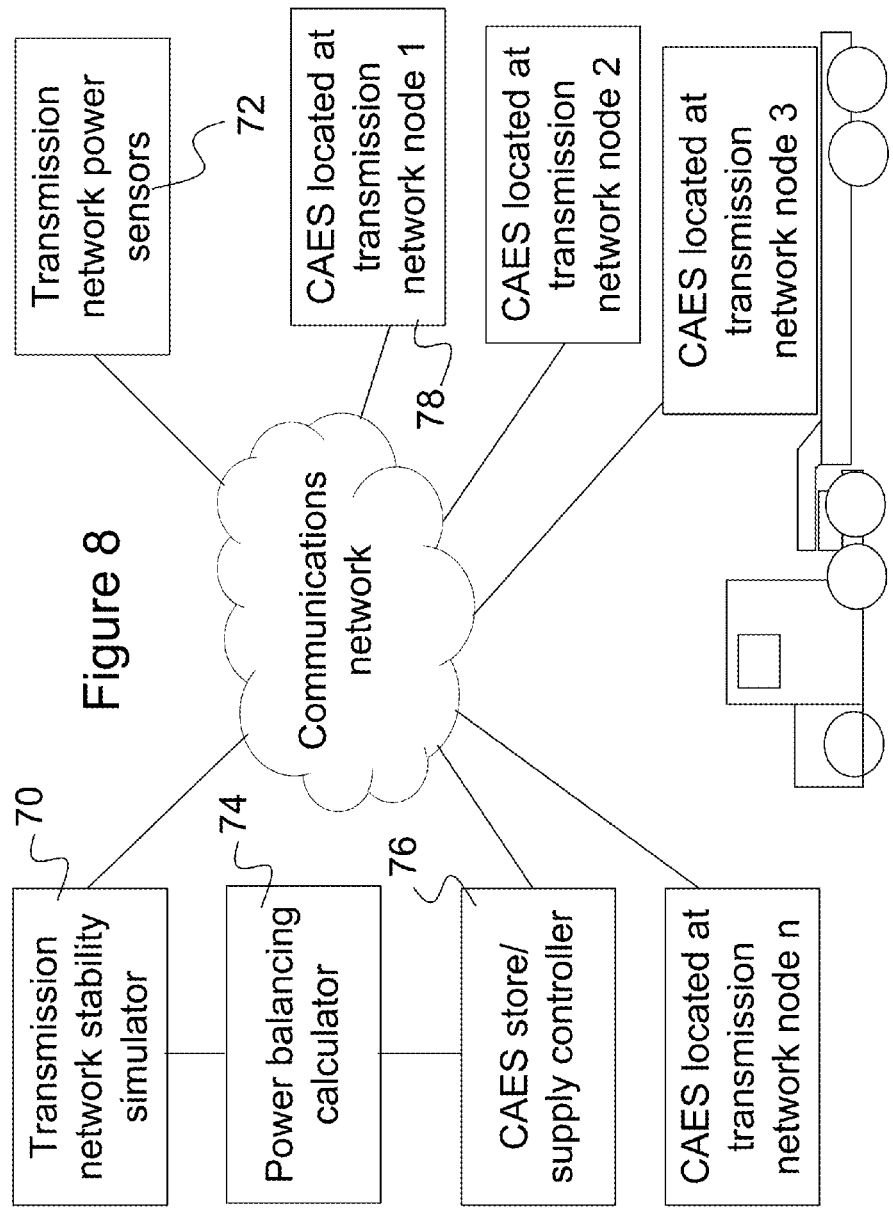

COMPRESSED AIR ENERGY STORAGE AND RECOVERY

The present application is a continuation-in-part of PCT/CA2014/000294 filed Mar. 31, 2014 that designates the United States and that claims priority of U.S. provisional patent application 61/807,914 filed Apr. 3, 2013.

TECHNICAL FIELD

This patent application relates to one or more of the following technical fields: compressed air energy storage (CAES); heat transfer fluids; heat exchangers; and electrical power transmission stabilization systems.

BACKGROUND

The storage of mechanical energy using compressed air has a long history. Air is compressed using a compressor for storage in a tank or reservoir, and when the energy is needed, the compressed air is fed to a motor (e.g. turbine or piston engine), and the mechanical energy is either used directly to perform work or converted to electricity using a generator. Some such systems were developed for powering vehicles, such as trains or cars, and systems have been developed for storage of electrical power where electric motors drive the compressors during storage, while generators are driven by the compressed air motor or turbine for providing the stored power contained in the compressed air storage.

In one example, it has been proposed in recent years to store a large amount of energy, such as tens to hundreds of megawatt hours, in underground salt mine caverns. Such storage can be done without much environmental impact, and is considered to be a "green technology". An example is found in US patent publication 2011/0127004. The storage of tens to hundreds of megawatt hours (MWh) is beneficial to electrical power generation and distribution networks, where supply and demand do not always coincide.

As is well known, when air is compressed, its temperature rises. The amount of heat released by compressing air stored at ambient temperature increases with the pressure of storage. In an underground cavern, the preferred pressure for storage is about 65 to 85 bars, and the temperature of the compressed air can be around 250° C. to 750° C. In US patent publication 2011/0127004, it is known to use thermal storage for storing the heat of the compressed air before sending it to the storage reservoir, and to restore heat to the compressed air before using it in an air motor-generator.

It is recognized in 2011/0127004 that the construction of a heat exchanger that can handle pressures between 65 and 85 bars is a challenge. For this reason, some prior art systems are designed to simply cooling of compressed air and heating of restored air at the sacrifice of efficiency. For example, some systems cool compressed air quickly using a water spray (see patent application publication US20120286522). Other systems use the heat of combustion to restore heat during recovery (see U.S. Pat. No. 5,491,969).

The problems associated with known CAES systems, as for example are described in US patent publication 2011/0127004, include the need for a large storage reservoir for the compressed air and either the size or high cost of the heat exchanger required. When the heat exchange system is simplified, this can come at the cost of heat losses that reduce efficiency of the CAES system.

SUMMARY

Applicant has discovered that the heat exchange efficiency increase associated with compressed air above 200 bars can result in a less costly heat exchange sub-system, notwithstanding the significant increase in difficulty in making a heat exchanger able to withstand such high pressures. The increase in density of the compressed air improves heat transfer due to a greater heat capacity of the air and due to a reduction in flow rate for the same mass transfer rate that increases contact time for heat transfer to take place.

Likewise, the energy density of compressed air stored above 200 bars compensates for the greater cost of storage vessels designed to withstand such pressures, such that the cost of energy storage is reduced in comparison with other man-made storage reservoirs.

Applicant has discovered that a combination of compressed air storage above 200 bars with heat exchange above such pressures can provide for a CAES system sufficiently compact that, following current designs, a 500 kW to 2 MW, 500 kWh to 4 MWh facility operating with better than 70%, and preferably better than 85%, efficiency can be provided on a conventional transport trailer platform for transport on conventional roadways. Such a compact system able to satisfy a moderate scale, grid power peak shaving need is a significant improvement over the state of the art energy storage systems.

The compressed air stored at pressure-potential energy is a free energy, which is largely a lack of entropy. The lower entropy of the air after compression can be used to convert heat to work with an efficiency that is not limited by the Carnot cycle, for the simple reason that the expansion of the air is not a cycle.

Even if the compression of the air is followed by an expansion cycle, the efficiency of CAES is very different from the efficiency of a Carnot heat engine. In the Carnot cycle the work is done over a cycle. It transfers heat from a high to a low temperature reservoir divided by the heat transferred.

Applicant has further discovered that the addition of external heat to thermal storage (or to the heat exchanger during recovery) of a CAES system can result in $\eta_{Gr}$% (Eq. 15 below) of conversion of the external heat into mechanical energy. While the amount of heat that can be added to the CAES thermal storage in this way is limited, the efficiency of conversion is better than for a conventional Carnot cycle for heat at the same temperature.

The efficiency of a CAES system is generally the ratio of the work out to the work in, or the ratio of the work of the expander to the work of the compressor. Therefore, if more heat is added to the air during the expansion that was taken during the compression, the efficiency of the CAES system can actually be greater than 100%.

The system according to some embodiments are based on the heat system recovery disclosed herein, thermal fluid disclosed herein, air expander and selected compressors with an exhaust gas temperature of 230° C. In a first case that the pressure is at 400 bars, and when the heat used at the air expansion is just the recovered heat during compression, the thermal exergy of the compressed air, $E_{a(T)}$, is more than half of the mechanical exergy of the compressed air, $E_{a(M)}$. During the charge or storage period, for each kW of exergy, 0.448 kW of heat exergy is extracted from the compressed air and stored by the flowing thermal fluid, and 0.458 kW is stored as compressed air. When the grid demands electric power, the compressed air is heated using 0.383 kW of thermal exergy and expanded through an air expander offering 0.748 kW to the grid.

In a second case, the compressors work at 400 bars, and when the heat used at air expansion is both the recovered heat during compression and an additional thermal exergy from electric resistance, thermal source or any kind of energy source. During the charge or storage period, for each 1 kW of exergy, 0.448 kW of heat exergy is extracted from the compressed air and stored by the flowing thermal fluid, if we estimate an external heat added to the recovered heat at 0.5 kW, 0.458 kW is still the exergy stored as compressed air. When the grid demands electric power, the compressed air is heated in this case using 0.81 kW of thermal exergy and expanded through an air expander offering 1.128 kW to the grid.

It will be appreciated that the presence of an additional thermal energy stored with the heat generated during compression can make the global performance of the CAES system exceed 1.

Some embodiments described herein can be used for renewable energy providers, manufacturers, diesel electrical generators, grid operators as well as end-users of energy.

Some embodiments described herein do not require the use of gas turbines or any other type of fossil fuel system and do not require use of water, water mist or water vapor; they are perfectly ecological (no production of greenhouse gas emissions). They are also different from the isothermal CAES which are not used for long-term storage and do not recover heat during compression which directly impacts the system efficiency.

Some embodiments described herein provide a regular and continuous rate of electricity to their customers. As well as the suppliers, the end users of energy can use this technology to reduce their energy bill by storing electrical energy during the lower pricing periods and use the stored electricity at the time when the pricing per kW is at a higher point.

Also, some embodiments described herein have been designed to directly integrate with different type(s) of renewable energy technologies (including wind turbine and large solar technology deployments). In these cases, the electrical energy storage unit can replace the renewable energy unit(s) and provide the same capacity to the power grid.

BRIEF DESCRIPTION OF THE DRAWINGS

The inventions will be better understood by way of the following detailed description with reference to the appended drawings, in which:

FIG. 4A is a sectional view of a heat exchange pipe illustrating exterior and interior pressure;

FIG. 4B is a sectional view of a heat exchange pipe illustrating tension force on the pipe wall material;

FIG. 4C is a partial sectional view of a heat exchange pipe or tube showing tension force;

FIG. 7 is a side view of one section of the heat exchanger shown in FIG. 6;

FIG. 8 is a schematic diagram of an electrical power transmission network stabilization system using CAES units for injecting and absorbing power at selected nodes of the transmission network for improving stability.

DETAILED DESCRIPTION

Figure 1:
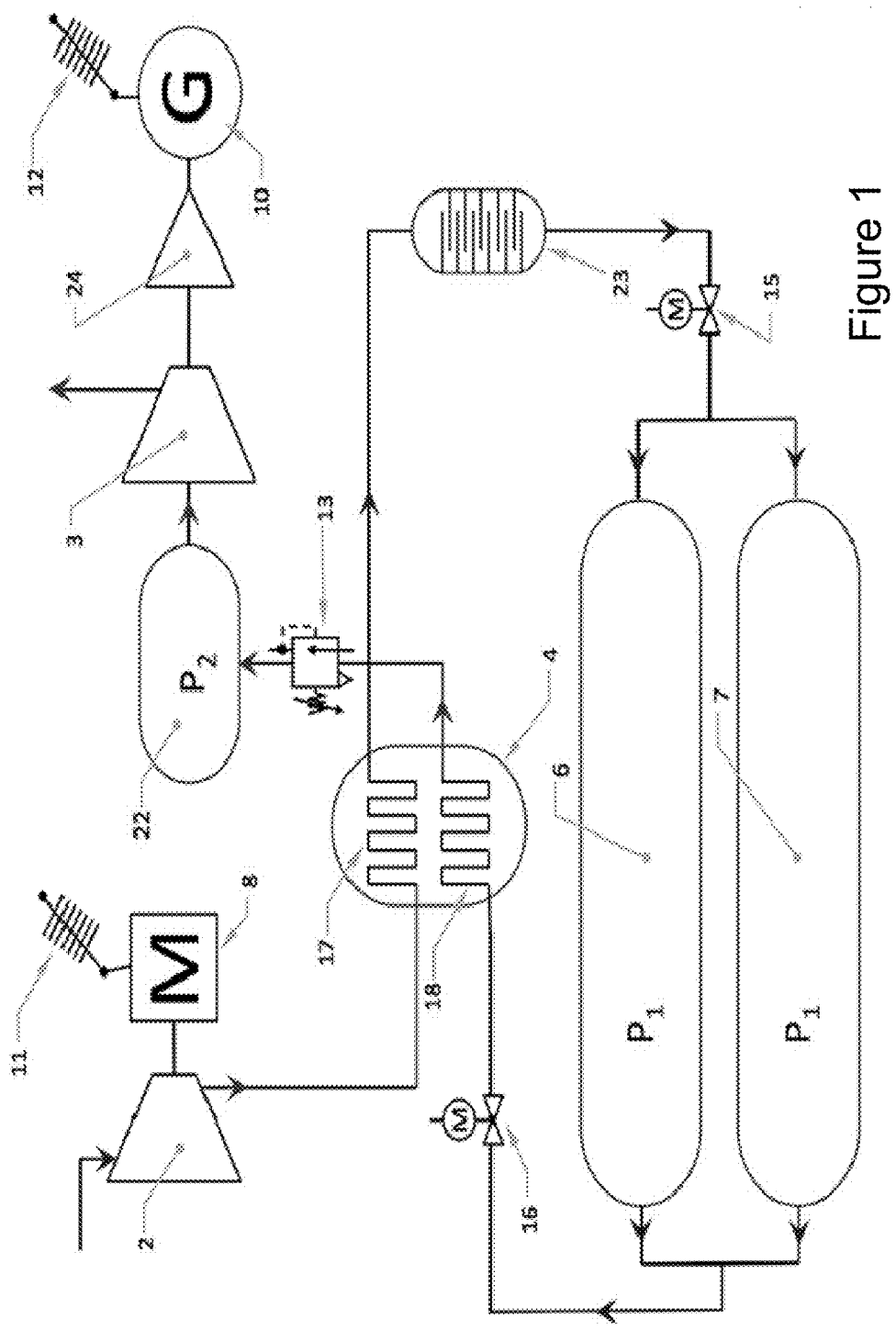
FIG. 1 is a schematic diagram of a CAES system having a single compression and heat exchange stage.

FIGS. 1 and 2 illustrate a first configuration and a second configuration respectively of a CAES system. In FIG. 1, there is a single compressor 2 for compressing air from ambient to the desired storage pressure, namely above 200 bars. In FIG. 2, there are two compressors 1,2 that provide for compression in two stages. While schematically shown as single compressor units, the compressors 1 and/or 2 can comprise a bank of compressors depending on the rate of power storage desired and the design of each compressor.

Without limiting the disclosure herein, an example of a suitable compressor is a Sullivan-Palatek primary oil-injected rotary screw compressor coupled to a Knox-Western secondary three-stage booster compressor package complete with: compressor, electric motor/drive that is able to compress air to 400 bars, consumes 600 kW and provides compressed air at a nominal temperature of 230° C. This model of compressor is cooled by oil cooling system, and the compressor cooling heat can be exchanged with the heat transfer fluid 30 for storage. However, in the configurations illustrated, the heat from air compression is absorbed primarily, if not entirely, using heat exchangers 4,5.

The compressors 1,2 are shown in FIG. 2 to be driven by separate transmissions and electric motors 8,9, however, it will be appreciated that a common transmission and motor arrangement may also be used. While the power source is shown as the electrical grid 11, it will also be appreciated that the power source can be a mechanical source (such as a water turbine or wind turbine) that replaces the electric motors 8,9 or an electrical source independent of the electrical grid, such as wind turbine, photovoltaic or solar thermal electrical generator, etc. instead of the grid 11. In FIG. 2, both compressors 1 and 2 are powered by electricity from the grid 11 (electricity subject for storage) and the electric motors 8 and 9 are arranged at ends of transmissions.

As will be appreciated, a suitable transformer, namely a so-called step-up transformer, can be used to connect the CAES system to the grid 11. A starting device, for example a static frequency converter, can be used for generator 10. Typically in an AC transmission line, generator 10 would be a three-phase generator synchronized with a timing signal of the AC transmission network and configured to provide power at the voltage of AC transmission line.

In FIG. 2, motors 9/8 can be operated just as an electric motor not as a generator which eliminates the obligation of using mechanical and electrical switches and makes the system lighter. The outlet gas/air of the first compressor feeds the second compressor passing through the heat exchanger 17 and heat exchange fluid 30 of the reservoir system 4, as will be described in greater detail below with reference to FIGS. 6 and 7.

An expansion reservoir 25 after both the first compressor 1 and the first heat storage container 4 is arranged to make the multiple expansion stages more efficient. The second outlet gas from the second compressor 2 feeds the high-pressure gas tanks 6,7 after passing through the second heat exchanger 19 associated with the molten salt tank 5. As shown, a motor controlled pressure valve 15 controls pressure in the tanks 6,7, and valve 16 controls pressure in reservoir 22.

The two-stage compression and heat transfer arrangement of FIG. 1 can improve efficiency of compression in the second compression stage 2 by reducing the temperature of the air to be compressed.

The compressors 1 and 2 feed and compress ambient air, which is stored in pressurized form in the storage volume 6 and 7. According to one embodiment of the invention, the coolers (molten salt tanks 4 and 5) are arranged downstream from the compressors 1, 2 and upstream of the storage volume 6 and 7. The cooler 4 and 5 can be used to cool down the fluid and store the thermal energy, which was heated during the compression, before it is supplied to the storage tanks 6 and 7. Within both molten salt tanks 4 and 5, heat exchangers 17 and 18 allow thermal energy transfer between gas tube and molten salt.

The difference between the two configurations of FIGS. 1 and 2 is limited to the compression part and its thermal storage system. The description of the second configuration (FIG. 2) is almost the same of the first.

In FIG. 2, the compressors 1 and 2 are illustrated as simple turbo-compressors; without any restriction to the invention, the compressors may also comprise inter-stage pressure small tank compressor, or two or more compressors connected in series in terms of the flow may be arranged on multi-shafting, with or without inter-cavities.

A step-up or step-down gearbox, which is not illustrated in the present exemplary embodiment may be used, and may likewise be arranged within a transmission between the electrical machine and the compressor and/or the air-turbine and generator, such that the rotational speed of the respective power machine differs from the rotational speed of the air turbine.

The next paragraphs are for both first and second configurations (FIGS. 1 and 2).

The electrical storage system is operated in a manner known per se in different climates, by way of example, if it operates in humid climate, a dehumidifier is used 23 and arranged upstream from the high-pressure tanks 6 and 7 in the flow path of the CAES. The dehumidifier 23 can be of conventional construction.

Particularly in periods of high-energy demand, the CAES system is operated in the power generation mode. In this case, compressed air is released gradually using the electrovalve 16 and controlled using the pressure regulators 13 and 14. To improve the efficiency the expansion is done gradually (multiple expansion stages) using the air cavity 21.

While the heat exchanger tubes 17 and 19 for cooling are schematically illustrated as being separate from the heat exchanger tubes 18 and 20, it will be appreciated that the same heat exchanger tubes can be used for absorbing heat from the compressors 1,2 as for heating stored air from tanks 6,7 being fed to turbine 3.

During the expansion from the storage tanks 6 and 7, the storage fluid flows through the salt-melt vessels 4 and 5 before and after the expansion cavity 21 and recovers the stored thermal energy. Stored thermal energy is used to increase the efficiency of the system. The heat transfer from the molten salt is performed using a heat exchanger 19 and 20 placed in tanks 4 and 5.

As an example, tanks 6,7 can be made of cylinders approximately 9.14 m long, with a diameter of 40.6 cm and a bore of maximum 34.24 cm and nominal 33.34 cm. The material of the cylinders can be SA-372 grade J class 70 as grade steel. With a total volume of 765 liters, and a storage pressure of 460 bars, the energy storage capacity is 0.1 MWh per tank when the compressed air is fully restored with supply of the heat generated from compression and transferred to and from the heat transfer fluid 30 that comprises a latent heat storage material. This is an equivalent of about 15 liters (4 US gallons) of gasoline per tank in terms of mechanical energy, and about 25 liters of gasoline for combined mechanical and thermal energy.

When dry air is compressed up to storage pressure, the energy of compression is transformed into two forms, namely potential energy due to compression and thermal energy. When moist air is compressed, moisture is condensed and provides more heat energy, while preferably requiring removal of the water. While the potential energy can be stored losslessly for long durations in tanks 6,7, the thermal energy is captured as best as possible and stored in the heat transfer fluid 30 in tanks 4,5. Heat storage will lose heat to the environment with time. Without returning the heat to the stored compressed air, only a portion of the energy used to originally compress and store the air will be returned, however, if all of the heat energy is returned, then full energy of the compressed air will be returned to turbine 3.

In the following table, there is shown the steady state (i.e. at the given pressure, and not from 0 bars up to the given pressure) energy storage proportions in potential energy and heat energy for dry air (ignoring the impact that moisture has on energy).

TABLE 1

Energy storage proportions for compressed dry air

| Pressure | air compressed Energy | Heat Energy |
|---|---|---|
| 20 bars | 70.35% | 29.65% |
| 50 bars | 68.70% | 31.30% |
| 100 bars | 64.44% | 35.56% |
| 200 bars | 59.27% | 40.73% |
| 300 bars | 55.05% | 44.95% |
| 400 bars | 49.44% | 50.56% |
| 500 bars | 47.05% | 52.95% |
| 600 bars | 44.62% | 55.38% |

As will be appreciated, the heat energy portion increases significantly as pressures rise above 200 bars. When pressure is above 400 bars, heat energy dominates the stored energy. Thus storing compressed air using compressors adapted to compress air from 200 bars to pressures such as 300 bars, 400 bars or even 500 bars or above, provides for efficient energy storage since heat storage plays an increasingly important role in the combined energy storage.

The heat exchangers 19 and 20 are, in addition, particularly well suited for use of low and medium-temperature heat, such as solar heat or other heat that is produced at a low-medium-temperature level, since the inlet storage fluid is at a medium-temperature and there is generally no need for a high inlet flow temperature for the air turbine 3. In contrast, the temperature after expansion will drop considerably and the heat exchange with the molten salt makes the temperature drop near to ambient temperature.

While not essential, it will be appreciated that it is preferable to compress air to the desired storage pressure at which pressure the heat can be exchanged in the heat exchanger 17,19, prior to then entering the tanks 6,7 following valve 15. This allows the percentage of heat energy recovered to be the same for the whole of the compression cycle. Storage of energy in latent heat storage is general more cost effective than storage as compressed air, so it can be desirable to maximize the amount of heat stored as heat instead of compressed air. Particularly when the tanks 6,7 have been previously discharged to regenerate stored energy this means that a pressure drop occurs across valve 15.

During energy recovery or regeneration, the expansion of compressed air across valve 16 causes cooling of the air. The low temperature of the air increases the temperature difference between stored heat and the air within the heat exchanger 18,20 and results in a greater efficiency of heat transfer. Thus, even at higher flow rates in the heat exchangers due to the lower pressure, heat can be efficiently restored to the air in reservoir 22 prior to being used in turbine 3.

If air is restored at a temperature below a moderate temperature, for example below 30° C., then this makes it easier to use commercially available, low-cost expansion air turbines, which are not designed for extremely high inlet temperatures. Limiting the inlet temperature means that there is no need to use expensive materials which are resistant to high temperatures and are expensive to process. However, if the original ambient temperature of the compressed air was around 10° C., then restoring the expanded air (after turbine 3) to a temperature around 40° C. using additional heat will provide for improved efficiency. In FIG. 2, an electrical resistive heater 32 is provided to take surplus power from grid 11 and add thermal heat to thermal storage 5 for this purpose.

Even after reaching full storage capacity in tanks 6,7, the CAES system can use an available surplus production of electricity by storing it in heat form by increasing the heat enthalpy in the medium of heat storage 5 using the electric heat resistance 32. By making the heat storage capacity of heat storage unit 5 greater, this can provide an additional way in which the CAES system can store energy from the grid or other power source. In the case the system stores such extra heat energy, the air expansion will have more volume proportional to the heat provided by the unit 5.

Heating the storage fluid 30 prior to expansion in the air turbine 21 increases the mass-specific enthalpy gradient of the storage fluid, thus increasing the achievable power yield from the storage fluid, which is stored in the storage tank volume 6 and 7. When a large amount of renewable energy is available or when the price of electricity from a provider is low, for example at high production of renewable electric power or at night when the power storage station is operated in the charging mode. In this case, the compressors 1 and 2 feed a compressed storage fluid to the storage tanks 6 and 7.

To make a good thermodynamic interpretation of the CAES energy cycle, we used exergy-flow, which is based on the second law of thermodynamics. Exergy can be defined as the maximum useful work possible that is accomplished during a process that brings the system into equilibrium with its environment. For the CAES system, the potential and kinematic energy effects are negligible and no chemical reaction occurs, so the exergy of an air stream can be expressed as:

$$\dot{E}_{air} = \dot{m}_{air}[h - h_0 - T_0(s - s_0)] \quad (1)$$

Where h and s are specific enthalpy and entropy, respectively, and the subscript 0 indicates that the properties are taken at room temperature and standard pressure.

In the case of perfect gas flow:

$$h - h_0 = C_p(T - T_0) \quad (2)$$

$$s - s_0 = C_p \ln\left(\frac{T}{T_0}\right) - R\ln\left(\frac{P}{P_0}\right) \quad (3)$$

Where $C_p$ is isobaric specific heat at average temperature and R is the specific gas constant. The exergy in Eq(1) can be split into two parts, the mechanical part and the thermal part as follows:

$$\dot{E}_{air} = \dot{E}_{air(M)} + \dot{E}_{air(T)} \quad (4)$$

$$\dot{E}_{air(M)} = \dot{m}_{air}RT_0\ln\left(\frac{P}{P_0}\right) \quad (5)$$

$$\dot{E}_{air(T)} = \dot{m}_{air}C_p\left(T - T_0 - T_0\ln\left(\frac{T}{T_0}\right)\right) \quad (6)$$

Only the mechanical exergy of the compressed air is stored in the air storage, and the thermal exergy of CAES is stored in the thermal energy storage and reused during the expansion process.

The isentropic efficiencies of the compressor and expander, $\eta_{C,i}$ and $\eta_{E,i}$, respectively, are expressed as:

$$\eta_{E,i} = \frac{W_E^{out}}{W_{E,i}^{in}} = \frac{h_{in} - h_{out}}{h_{in} - h_{out,s}} \quad (7)$$

$$\eta_{C,i} = \frac{W_{c,i}^{out}}{W_c^{in}} = \frac{h_{out,i} - h_{in}}{h_{out} - h_{in}} \quad (8)$$

Where the subscript i denotes an isentropic compression/expansion process. The efficiencies of motor and generator, $\eta_M$ and $\eta_G$, are expressed as:

$$\eta_m = \frac{w_c^{in}}{E_c^{in}} \quad (9)$$

$$\eta_g = \frac{E_E^{out}}{W_E^{out}} \quad (10)$$

For multistage compression, each stage was assumed to consist of an adiabatic compression process, and each stage had the same pressure ratio; the compressed air was cooled to the ambient temperature by intercooling. Moreover, the total compression work and heat rejection are the sums of individual values of these quantities at all stages. For the discharging process, the recuperator can be used for recovering the heat of the expanded hot gas.

The CAES system is adiabatic and requires no fuel to heat the compressed air for the expansion process (added heat is optional), representing an emission-free, pure storage technology with high storage efficiency. The heat needed to heat the compressed air for the expansion process is recovered from the compression and stored in a thermal energy storage (TES) unit or the stored thermal energy stored combined to a clean sours of wasted thermal or electrical energy.

For the CAES system using only the stored thermal energy, the global efficiency $\eta_{Gl}$ is calculated as:

$$\eta_{Gl} = \frac{E_{out}}{E_{in}} = \frac{E_M^{out} + E_T^{out}}{E_M^{in} + E_T^{in}} \quad (11)$$

In case of using a fuel source, the net electrical storage efficiency of a CAES system can be calculated by adding the amount of electric energy generated by natural gas (or whatever the external heat source is chosen to be):

$$\eta_{Gl} = \frac{E_{out}}{E_{in} + Q_f} = \frac{E_M^{out} + E_T^{out}}{E_M^{in} + E_T^{in} + Q_f} \quad (12)$$

Therefore, if the energy source is provided from another non-waste energy source as fuel new expression for the electrical storage efficiency of the CAES system, it is given as:

$$\eta_{Gl} = \frac{E_{out}}{E_{in} + Q_f} = \frac{E_M^{out} + e_T^{out}}{E_M^{in} + E_T^{in} + E_T^{ext}} \quad (13)$$

The reason we use the additional thermal energy in the denominator is because there is a cost attributed to these sources and they are considered as a part of the input energy.

In our case, we use additional thermal energy from an extra-unused energy from a thermal source or converting electrical source to thermal energy by using an electrical resistance. We use this additional energy when the pressure tanks have reached their maximum storage capacity, or at any time during the storing process. In the equation of global efficiency, this term of additional energy is expressed in the numerator because it does not have a cost in the input energy, but is counted as a gain as output energy. The new expression of the global efficiency can be expressed as:

$$\eta'_{Gl} = \quad (14)$$

$$\frac{E_{out}}{E_{in} + Q_f} = \frac{E_M^{out} + E_T^{out} + E_T^{ext}}{E_M^{in} + E_T^{in}} = \frac{E_M^{out} + E_T^{out}}{E_M^{in} + E_T^{in}} + \frac{E_T^{ext}}{E_M^{in} + E_T^{in}} = \eta_{Gl} + \eta'$$

The use of an external additional thermal energy source to heat expanded air can give the CAES system greater performance. The growth of the efficiency is expressed as:

$$\eta_{Gr}\% = 100\eta'/\eta_{Gl} \quad (15)$$

The pressure regulator 13 is responsible for controlling the gradual expansion of compressed air from tanks 6,7 into reservoir 21, while the pressure regulator 14 is responsible for maintaining the pressure in the reservoir 22 at the right pressure needed for the efficient working of the air turbine, for example 20 bars. The reservoir 22 is maintained at the pressure P2. The air turbine is operating under a pressure gradient (P2-Patm) between the inlet and the outlet of the airflow, and provides the correct torque to drive the generator 10. P2 pressure in the reservoir 22 will be modified if more or less torque is required when changing the generator (for example from a 600 kW to a 250 kW generator). In the event that there is insufficient pressure to supply 20 bars in reservoir 22, a torque amplifier (e.g. a CVT) 24 can be used.

Figure 3A:
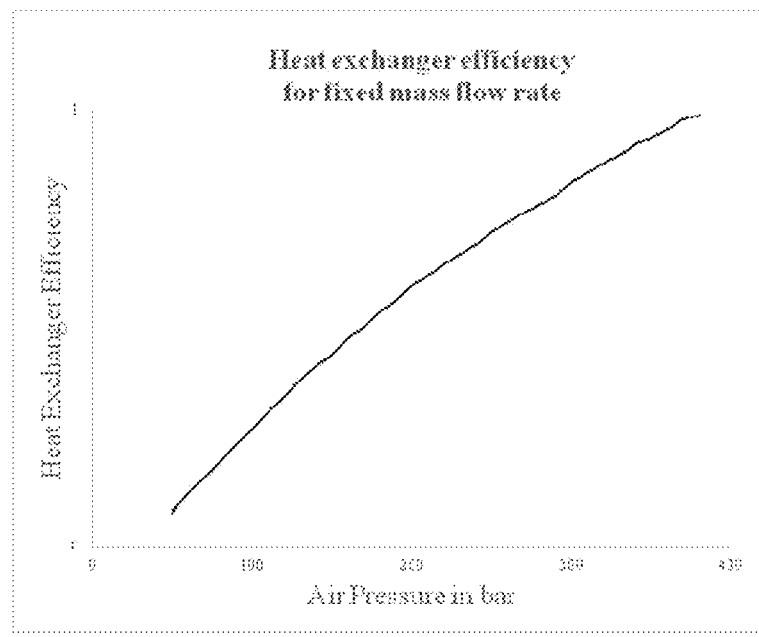
FIG. 3A is a schematic graph of heat transfer per heat exchanger area for fixed mass flow rate.

If the dwell time of air through a heat exchanger is too short due to flow speed, then a greater surface area of heat exchanger would be required, with the resulting increase in weight and cost. To reduce the surface area of the heat exchanger, low flow and high density of compressed air at high pressure can provide a given mass flow rate and heat capacity for absorbing heat that is more efficient than a much higher flow at lower pressure and density for the same mass flow rate. This is illustrated by the graph of FIG. 3A that shows how, for a given heat exchanger, the heat transfer capacity varies over a range of compressed air pressures in the heat exchanger. Likewise, for a fixed mass flow and thermal energy transfer rate, the heat exchanger area drops with increasing compressed air pressure in the heat exchanger. As will be appreciated, while cost and complexity are associated with higher pressures, there is an efficiency advantage to operating above 100 bars, and in particular above 200 bars.

System Cost Estimate for CAES System Having Heat Exchange

In the following, the cost of two key components are estimated, namely the cost of storage vessels and the cost of the heat exchanger components. The cost of thermal heat storage in the form of latent heat storage is neglected for simplicity, and the impact on the cost of compressor technology as a function of output air pressure is likewise neglected in the following. The cost of a compressor at 500 bar is 3 to 4 times the cost for 50 bar, however, the compressor power rating affects the rate of energy storage and not the rate of energy regeneration or the amount of energy storage. In many applications of peak shaving, energy can be stored over many hours that are off-peak or when an energy source such as wind or solar is available, while providing peak power at a much higher power level than the energy source power level. In such cases, the cost of compressed air storage tanks becomes a dominant factor in the cost of a CAES system.

The expression of the energy density from volume in liters (L) and from pressure in atmospheres (atm), requires the use of a conversion factor:

$$\frac{W}{V_0} = 101.325 \cdot P_a \cdot \left[1 + \left(\frac{P_0}{P_a}\right)\left[\ln\left(\frac{P_0}{P_a}\right) - 1\right]\right]$$

where:
W=stored work (Joule);
V0=volume of storage unit (L);
Pa=ambient pressure in an open system, or low pressure for a closed system (atm); and
P0=pressure in the tank (atm).

So, under standard conditions where:

$$V_0 = 1 L;$$

$$P_a = 1 atm; \text{ and}$$

The inverse of W/V0 represents the volume of a tank required to store a given amount of energy. This formula may be expressed in units of L/kW·h·according to the following equation:

$$\frac{V_0}{W}\left(\frac{L}{kW \cdot h}\right) = 3600\left(\frac{W}{V_0}\right)$$

Applying the previous formula to calculate the amount of energy in the form of air pressure at 370 bar stored in 10,000 liters (10m3), we obtain 516 kW·h.

Energy storage proportions for compressed dry air at 370 bar is 49% in thermal form and 51% in potential pressure energy form, This yields the following results at the given conditions:

| Pressure [bar] | Pressure Work W [%] | Heat Q [%] | Pressure Work W [kW] | Heat Q [kW] | Total Energy E (kW) |
|---|---|---|---|---|---|
| 370 | 51% | 49% | 516 | 499 | 1015 |

370 bar represents the right pressure to store 1 MW·h as total energy (thermal and pressure energy) in 10,000 liters of storage vessels capacity. Now, for the same storage vessel capacity (10,000 liters) at different pressures the quantity of the potential pressure energy and thermal energy are presented in the following table:

| Pressure [bar] | Pressure Work W[%] | Heat Q[%] | Pressure Work W[kW] | Heat Q[kW] | Total Energy E(kW) | % of 1 MW |
|---|---|---|---|---|---|---|
| 50 | 68.70% | 31.30% | 41 | 19 | 60 | 6% |
| 100 | 64.44% | 35.56% | 102 | 56 | 158 | 16% |
| 150 | 60.10% | 39.90% | 170 | 113 | 282 | 28% |
| 200 | 59.27% | 40.73% | 242 | 166 | 409 | 41% |
| 250 | 55.76% | 44.24% | 318 | 253 | 571 | 57% |
| 300 | 55.05% | 44.95% | 397 | 325 | 722 | 72% |
| 350 | 52.25% | 47.76% | 479 | 438 | 917 | 92% |
| 370 | 50.84% | 49.16% | 512 | 495 | 1007 | 101% |
| 400 | 49.44% | 50.56% | 562 | 575 | 1137 | 114% |
| 450 | 48.25% | 51.76% | 647 | 695 | 1342 | 134% |

It will be appreciated from the previous table that, for the same storage vessel capacity, the quantity of the energy stored decreases with decreasing pressure.

It can be seen in the previous table that for the same storage vessels capacity the quantity of energy stored decreases with decreasing pressure.

The typical commercial cost for a storage vessel adapted for 50 bar and having a volume of 2000 liters is US$1000, or about $0.50 per liter. The typical commercial cost for a storage vessel adapted for 100 bar and having a volume of 2000 liters is US$5000, or about $2.50 per liter. Suitable compressed air containers for such pressures are commercially available from Shandong Pulilong Pressure Vessel Co., Ltd., of China.

The typical commercial cost for a storage vessel adapted for 150 bar and having a volume of 3.2 liters is US$32, or about $10 per liter. Suitable compressed air containers for such pressures are commercially available from Liaoning Alsafe Technology Co., Ltd., of China.

At 200 bar, namely above 3000 psi, the ASME standard for pressure vessels changes and compressed air storage vessels of large volume are commercially rare. The ASME standard addresses mandatory requirements, specific prohibitions, and non-mandatory guidance for pressure vessel materials, design, fabrication, examination, inspection, testing, certification, and pressure relief, which justify the cost increase at this pressure.

On a per liter basis, many commercially available vessels for the pressure range of 200 bar to 350 bar are low volume and have a cost much greater than $35 per liter. CP Industries Inc. of McKeesport, Pa., USA, makes available a storage vessel adapted for 400 bar and having a volume of 764 liters at a cost of about US$26,740, or about $33 per liter. While it can be presumed that what can be made for 400 bar would be cheaper when made for 200 bar, there is no commercially available storage vessel for pressures between 200 and 350 bar that is less expensive on a per liter basis than the 400 bar vessel from CPI.

At 500 bar, the ASME standard also changes, and it can be expected that the cost would increase between 450 to 500 bar due to the standard, however, the cost for storing the compressed air required for 1 MW·h of energy storage would be expected to be less at 550 bar than at 450 bar.

The following table represents the number of liters to be used if we want to store the same amount of total energy as stored in 10,000 liters at 370 bar.

| Pressure [bar] | Volume needed for 1 MW·h [liter] | Air density [kg/m3] | MASS [KG] | Price per liter | Price of vessels |
|---|---|---|---|---|---|
| 50 | 166497 | 50 | 8325 | 0.5 | $ 83,248 |
| 100 | 63330 | 70 | 4433 | 2.5 | $158,326 |
| 150 | 35434 | 82 | 2906 | 10.0 | $354,344 |
| 200 | 24467 | 88 | 2153 | 33.0 | $807,423 |
| 250 | 17510 | 92 | 1611 | 33.0 | $577,830 |
| 300 | 13851 | 94 | 1302 | 33.0 | $457,068 |
| 350 | 10911 | 96 | 1047 | 33.0 | $360,056 |
| 370 | 9931 | 97 | 963 | 33.0 | $327,714 |
| 400 | 8793 | 98 | 862 | 33.0 | $290,184 |
| 450 | 7452 | 100 | 745 | 34.0 | $253,372 |

Figure 3B:
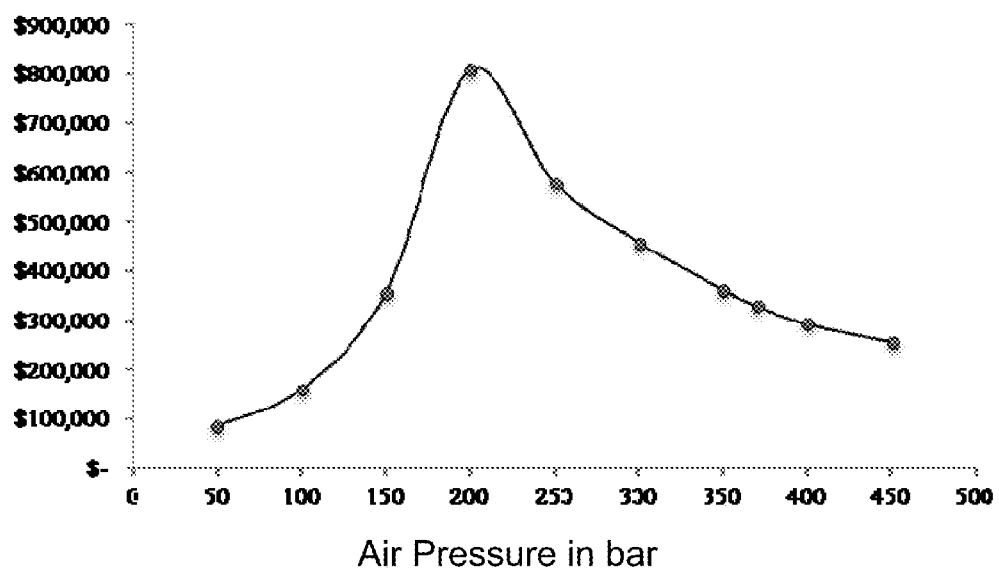
FIG. 3B is a graph of storage vessel cost estimation for storing a nominal amount of energy, namely 1 MWh, at a storage pressure between 50 to 500 bar.

The graph of estimated cost as function of storage pressure is illustrated in FIG. 3B.

The price of storage vessels and heat exchangers varies with their working pressure.

For the heat exchangers, more we have the mass of air, more heat exchangers we need.

The relation between the price and the surface area of air/liquid heat exchange is expressed as:

$$P_{H.Ex} = 1.14 + 604.4 \cdot \ln(A_{H.Ex})$$

$P_{H.EX}$: Price of heat exchanger in US dollars
$A_{H.EX}$: Area of heat exchanger in m2

| Pressure [bar] | volume needed for 1 MWh [liter] | air density [kg/m3] | MASS [KG] | Price of Exchangers |
|---|---|---|---|---|
| 50 | 166497 | 50 | 8325 | $122,481 |
| 100 | 63330 | 70 | 4433 | $182,626 |
| 150 | 35434 | 82 | 2906 | $213,749 |
| 200 | 24467 | 88 | 2153 | $253,428 |
| 250 | 17510 | 92 | 1611 | $189,609 |
| 300 | 13851 | 94 | 1302 | $153,243 |
| 350 | 10911 | 96 | 1047 | $123,285 |
| 370 | 9931 | 97 | 963 | $113,380 |
| 400 | 8793 | 98 | 862 | $101,431 |
| 450 | 7452 | 100 | 745 | $ 87,713 |

Heat exchanger area is proportional to flow rate that is in turn proportional to the total volume required per unit of energy storage, and is inversely proportional to air density. Both of these parameters are pressure dependent. This cost estimation is based on 1 MW compressor power, and the following source that is well known in the heat exchanger art, namely Seider, W. D., J. D. Seader, and D. R. Lewin, Product and Process Design Principles: Synthesis, Analysis, and Evaluation, Second Edition, Wiley, 2004.

Figure 3C:
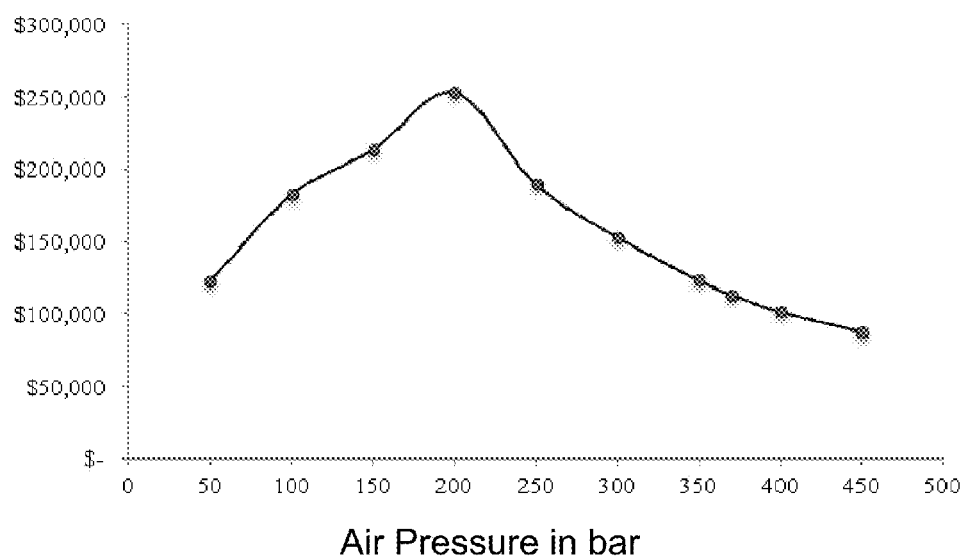
FIG. 3C is a graph of heat exchanger cost estimation for a heat exchanger effective in a system storing air at pressures varying from 50 to 500 bar.

The graph of estimated heat exchanger cost as a function of pressure is illustrated in FIG. 3C.

The combined estimated price of heat exchangers and storage vessels varies with pressures as follows:

| Pressure [bar] | Price of vessels | Price of Exchangers | Total price |
|---|---|---|---|
| 50 | $ 83,248 | $122,481 | $ 205,730 |
| 100 | $158,326 | $182,626 | $ 340,953 |
| 150 | $354,344 | $213,749 | $ 568,093 |
| 200 | $807,423 | $253,428 | $1,060,852 |
| 250 | $577,830 | $189,609 | $ 767,439 |
| 300 | $457,068 | $153,243 | $ 610,311 |
| 350 | $360,056 | $123,285 | $ 483,341 |
| 370 | $327,714 | $113,380 | $ 441,094 |
| 400 | $290,184 | $101,431 | $ 391,614 |
| 450 | $253,372 | $ 87,713 | $ 341,085 |

Figure 3D:
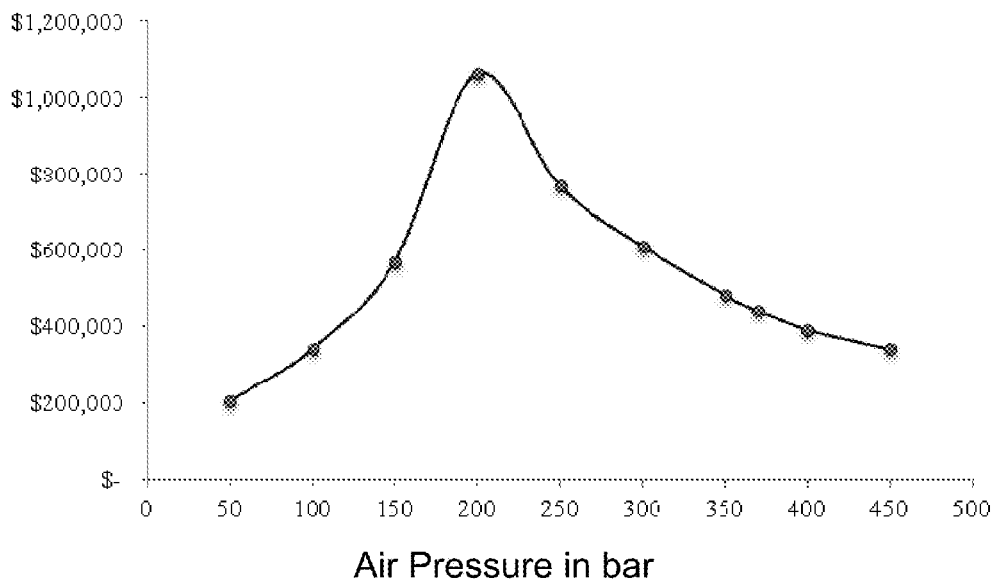
FIG. 3D is a graph of the sum of FIGS. 3B and 3C.

This is illustrated in FIG. 3D.

To show the impact of the footprint and mobility, the following table represents the number of containers needed to store 1 MW·h at different pressures:

| Pressure | Volume needed for | Number of vessels | Number of containers for storage vessels | |
|---|---|---|---|---|
| [bar] | 1 MW · h [liter] | (27 ft3) | 40' | 20' |
| 50 | 166497 | 218 | 8 | 1 |
| 100 | 63330 | 83 | 3 | 1 |
| 150 | 35434 | 46 | 2 | 0 |
| 200 | 24467 | 32 | 1 | 1 |
| 250 | 17510 | 23 | 1 | 0 |
| 300 | 13851 | 18 | 1 | 0 |
| 350 | 10911 | 14 | 0 | 1 |
| 370 | 9931 | 13 | 0 | 1 |
| 400 | 8793 | 12 | 0 | 1 |
| 450 | 7452 | 10 | 0 | 1 |

As can be appreciated, there is a significant increase in cost for storage vessels and heat exchangers as the operating pressure is increased from 50 bar up to 200 bar. However, the approximate cost for these two components peaks around 200 bar, and then drops. Thus, operation above 225 bar, 250 bar, 275 bar and certainly at or above 300 bar is desirable. Furthermore, at an operational pressure of 500 bar, Applicant has found the cost to be similar to the cost of operation at 100 bar. While the cost of compressors would be somewhat higher, there are many advantages to adiabatic CAES operation at pressures over 200 bars, namely the associated storage vessel footprint reduction and the greater ability to use thermal energy to boost CAES regeneration.

While the cost of a 1 MW compressor at 50 bar can be approximately $60,000, a 1 MW compressor operating at 400 bar can be approximately four times that cost. The differential in price is only about $180,000. While the system cost can thus be 3 times more when changing from 50 bar to 400 bar, there is a corresponding reduction in storage vessel footprint of about 18 times. When comparing a 100 bar CAES system to a 400 bar CAES system, the cost is about 1.5 times more, while the footprint is about 7 times less.

Heat Exchanger

The regulators 13 and 14 cooperate to ensure that the pressure P3 is still high enough for heat exchanger 20 to be efficient due to high enough pressure, while benefiting from cooling effect of the pressure drop from P1 to P3 to facilitate heat transfer in heat exchanger 20. This suitable pressure for P3 can be for example 200 bars, whereas the pressure P1 in the tanks 6,7 can be variable from as low as 200 bars (a nominal lower limit of high pressure storage before the pressure supply and control regimes begin to change) up to a maximum of around 400 bars to 600 bars.

The heat exchanger can use small bore tubes, as illustrated in FIGS. 4A, 4B and 4C. In FIG. 4A, an above ambient pressure is provided outside of the small tube 34. This can be achieved by pressurizing the heat exchange fluid 30, as better illustrated in FIGS. 5, 6 and 7. This pressurization can be achieved using the circulation pumps 44 (see FIG. 6) without increasing a pressure of the reservoirs 40 and 42, if desired. This way, the thickness of the tubes 34 can be reduced, and heat exchange efficiency improved. In FIG. 4B, the heat exchange fluid 30 is at ambient pressure, which simplifies the circulation of the fluid 30. Small-bore tubes 34 are advantageous because the tension force exerted on the tube wall material of thickness r2−r1 is given by the equation as follows.

When the internal heat exchanger tubes are pressurized, and since they have the open end, the balance of the forces is:

$$2F_\theta = \int_0^\pi (PLrd\theta)\sin\theta \qquad (16)$$

where P is the compressed air pressure and r is the average of the inner and outer radius r2 and r1.

$$F_\theta = PLr \qquad (17)$$

The nominal stress due to circumferential $\sigma_\theta$ because $F_\theta$ is acting on the section of material L.ϵ is given by $$\sigma_\theta = \frac{F_\theta}{L \cdot \varepsilon} = \frac{Pr}{\varepsilon} \qquad (18)$$

$$\varepsilon = \frac{P}{\sigma_\theta}r = \frac{1}{\left(\frac{\sigma_\theta}{P} - 0.5\right)}r_1 \qquad (19)$$

Since the yield stress of SS316L is constant and the operating pressure is assumed constant, the value of the thickness ϵ is linearly proportional to the internal radius of the tube. The smaller the internal radius r1 is, the smaller is the thickness ϵ, which gives a better heat exchange and reduces the thermal resistivity of the tube wall.

When we apply a pressure P1>Patm inside the shell (designated as 17 in FIG. 6) to the heat transfer fluid side and thus to the outer side of the high pressure air tubes, the constraint formula becomes:

$$\sigma_\theta = \frac{\Delta(P_2 - P_1)}{\varepsilon}r$$

Where pressure P2 the inside tubes pressure and P1 the outside tubes pressure within the shell.

When we increase the pressure P1 two possibilities are available, the first is reducing the tube thickness to keep the same $\sigma_\theta$, which increases the heat transfer. The second possibility is keeping the same thickness s and having a smaller $\sigma_\theta$ is witch allow as to change the tubes material from stainless steel to another type of metals less expensive and more heat conductor as copper.

A tube will burst when the material cannot withstand the tension force without tearing. As can be appreciated, shrinking the dimensions of a tube increases its capacity to withstand pressure. As air, even at high pressures from 200 bars to 500 bars, flows with acceptable resistance, small tubes can be used to advantage.

Figure 2A:
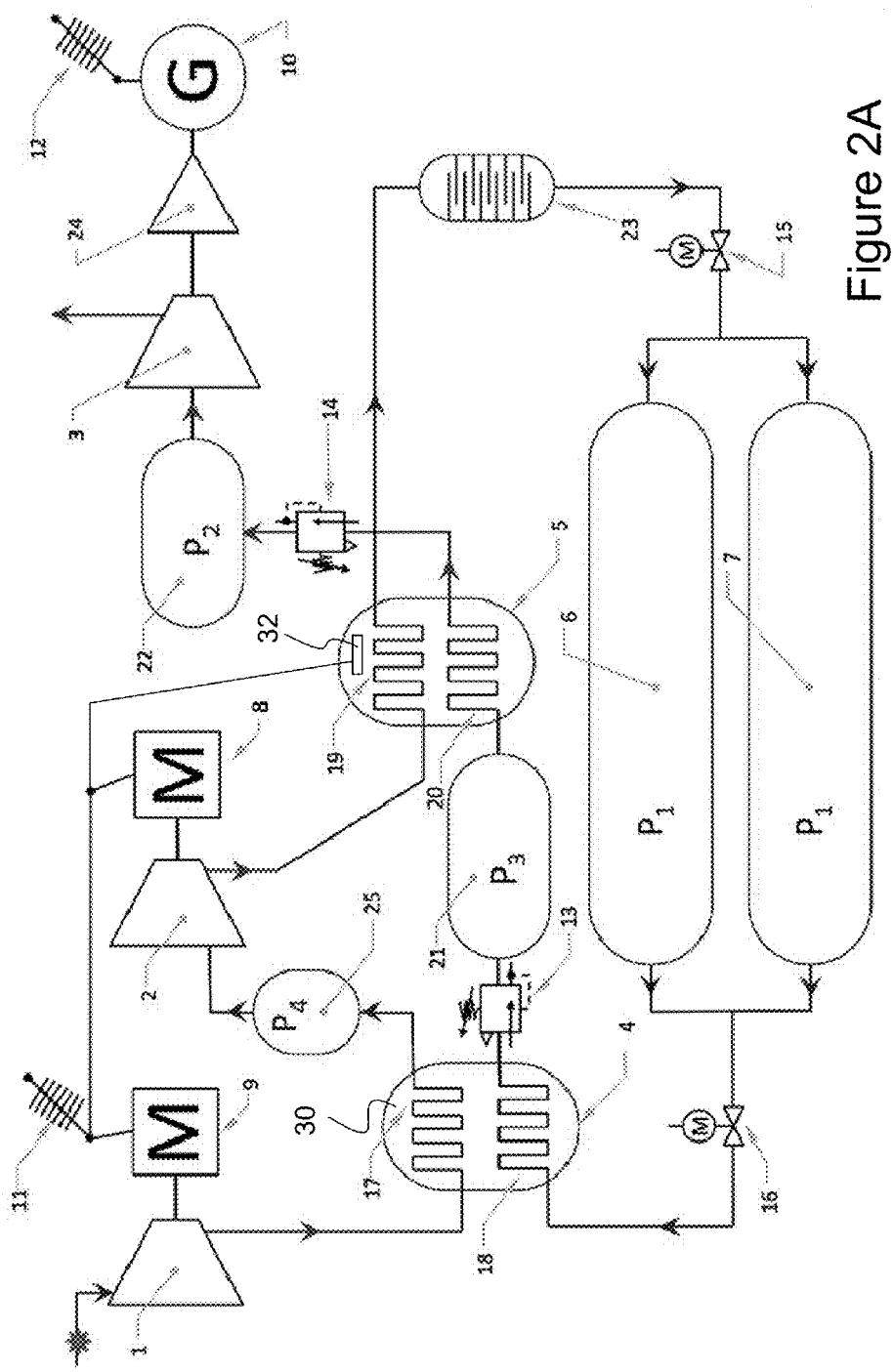
FIG. 2A is a schematic diagram of a CAES system having a two-stage compression and heat exchange operation.
Figure 2B:
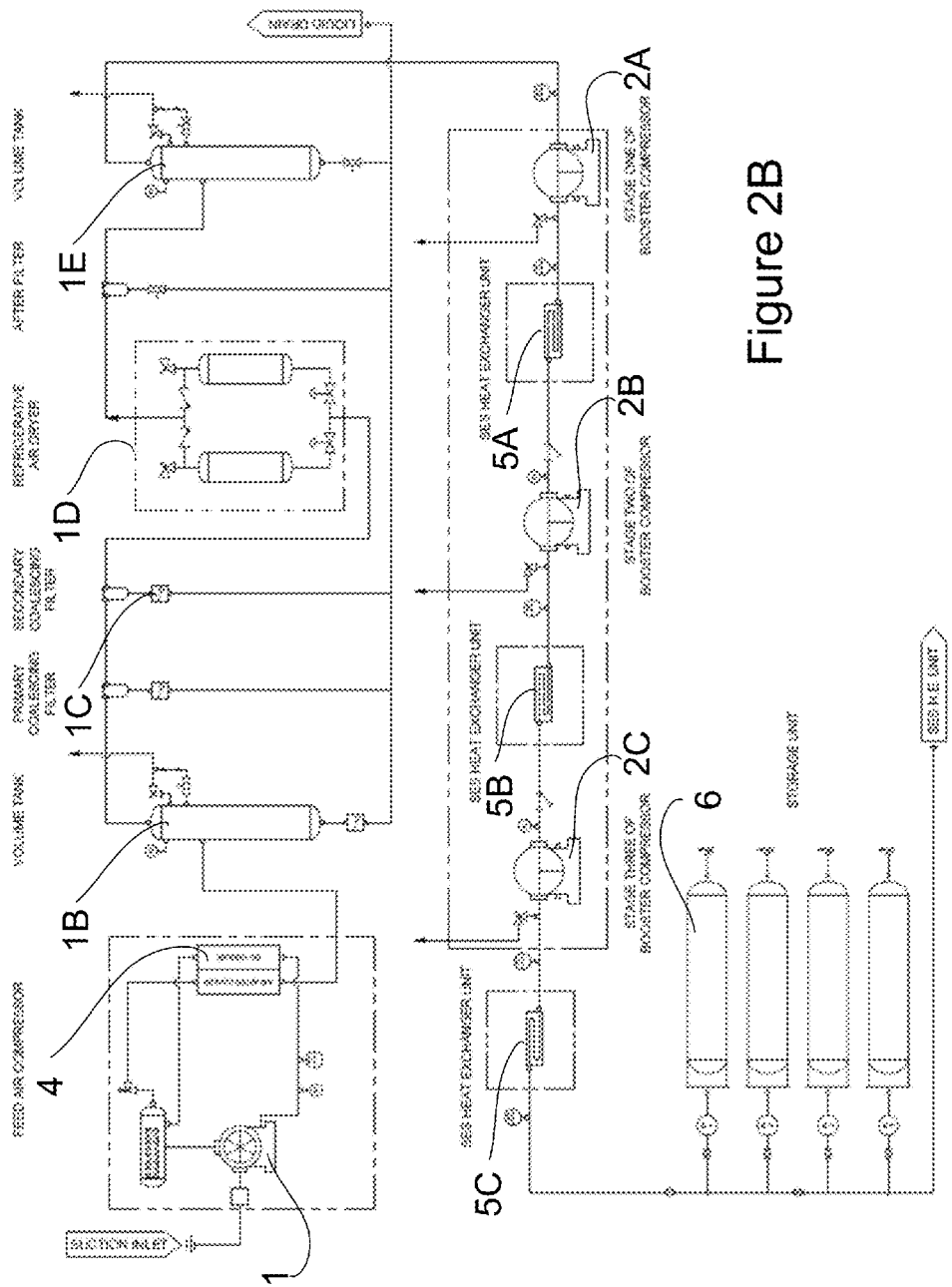
FIG. 2B is a more detailed diagram of a first part of the CAES system according to FIG. 2A.

The embodiment of FIG. 2A will now be described in greater detail with reference to FIGS. 2B, 2C and 2D. Any source of electrical or mechanical energy can be used to operate the system. The primary power source supplies the compressors 1 and 2 which comprise a screw compressor 1 of high-speed level for raising the pressure to approximately 150 psi or 10 bar. This pressure is needed to feed the compressors 2A, 2B and 2C. A first heat exchange system 4 removes a small amount of heat generated by compressor 1. To remove any moisture in the system, the air is dried before starting the process of high compression. A volume tank 1B, filters 1C, refrigerative dryer 1D and a further volume tank 1E can be used for this purpose. Once the air is dried, it passes through the first stage of compression 2A. At the output of the compressor 2A, the compressed air reaches a temperature over 230° C. The hot compressed air is sent to a heat exchanger system 5A. Heat is recovered by a heat transfer fluid 30 to be then stored in a tank 4B (shown in FIG. 2C) provided with thermal insulation. Cooled by the heat exchanger system, air passes in a second reciprocating compressor 2B to further increase the pressure of the system. At the outlet of the compressor 2B, compressed air reaches a temperature of about 130° C. The hot compressed air is sent to a second heat exchanger system 5B. Heat is recovered by a heat transfer fluid 30 to be then stored in a tank provided with thermal insulation, and this storage can be common with the storage for the previous heat exchanger. Cooled by the heat exchanger system 5B, air passes in a third reciprocating compressor 2C for compressing air to the final pressure of about 6000 psi or about 420 bars. At the outlet of the compressor 2C, compressed air again reaches a temperature of about 130° C.

It will be appreciated that heat exchange can be done using external heat exchangers as illustrated herein, or by using heat exchangers integrated within compressors, as is known in the art for cooling of the compressors, or by using a combination of both.

The hot compressed air at 420 bars is fed to a third heat exchanger system 5C. Heat is recovered by a heat transfer fluid 30 to be then stored in a tank provided with thermal insulation, either combined or separately from the storage associated with the other heat exchangers 5A and 5B. The cooled air is then stored in a unit of high-pressure cylinders 6. This unit can be either in a fixed installation or mobile.

Figure 2C:
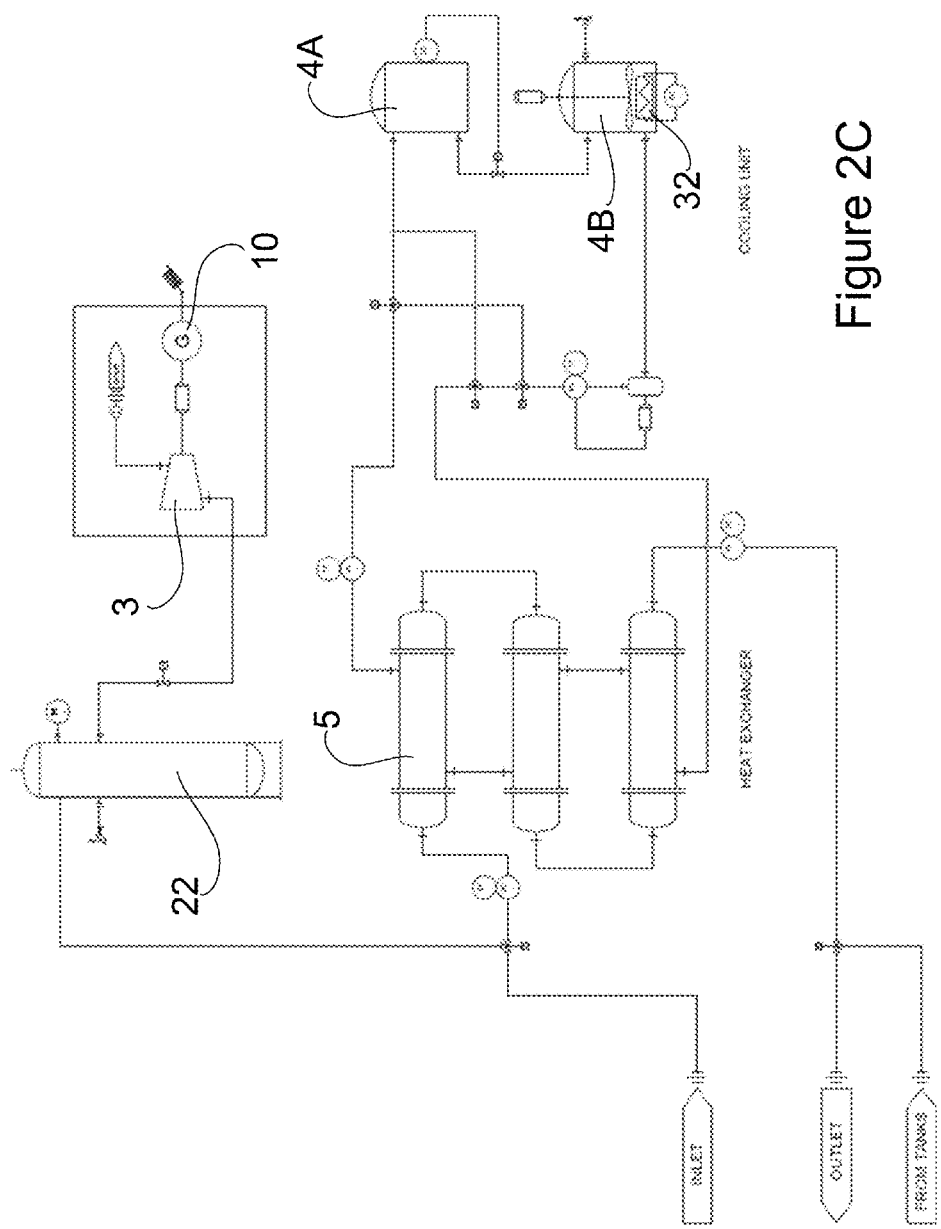
FIG. 2C is a more detailed diagram of a second part of the CAES system according to FIG. 2A.
Figure 2D:
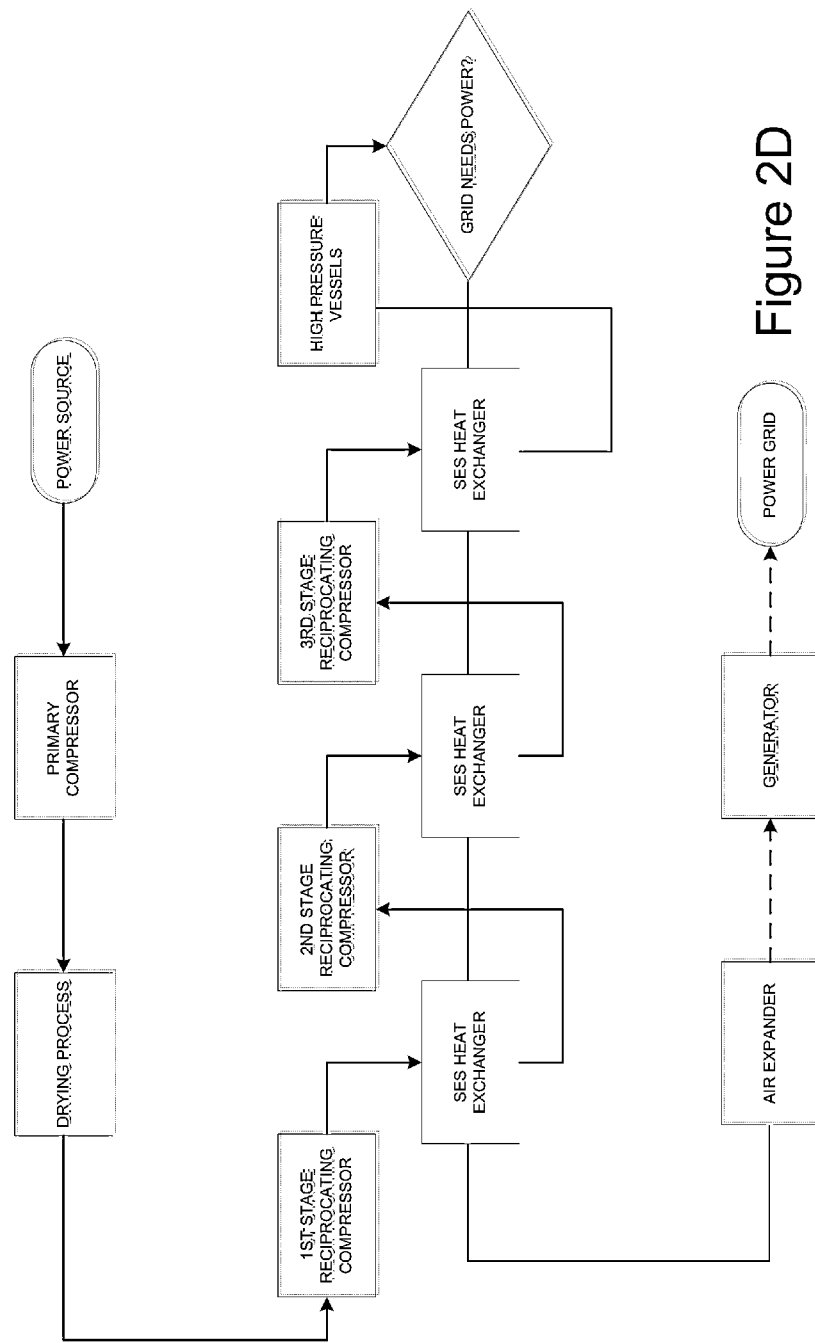
FIG. 2D is a process diagram of the CAES system according to FIG. 2A.

When there is a demand from the electric network for power, the system starts the reverse process with expanding air and recovering the stored heat energy, as shown in FIG. 2C. The temperature of the expanded air coming out of the storage unit drops below 0° C. The cold air passes through the heat exchanger 5 and is further expanded because of the recovered heat or with recovered and added external heat (e.g. using resistive heater 32). Warm, expanded air is stored in a tank 22 at a pressure of about 20 bars where it is ready to do work. The heated air expands and actuates a expander air motor 3. The rotation of the expander air motor 3 operates to turn an electrical generator 10.

Figure 5:
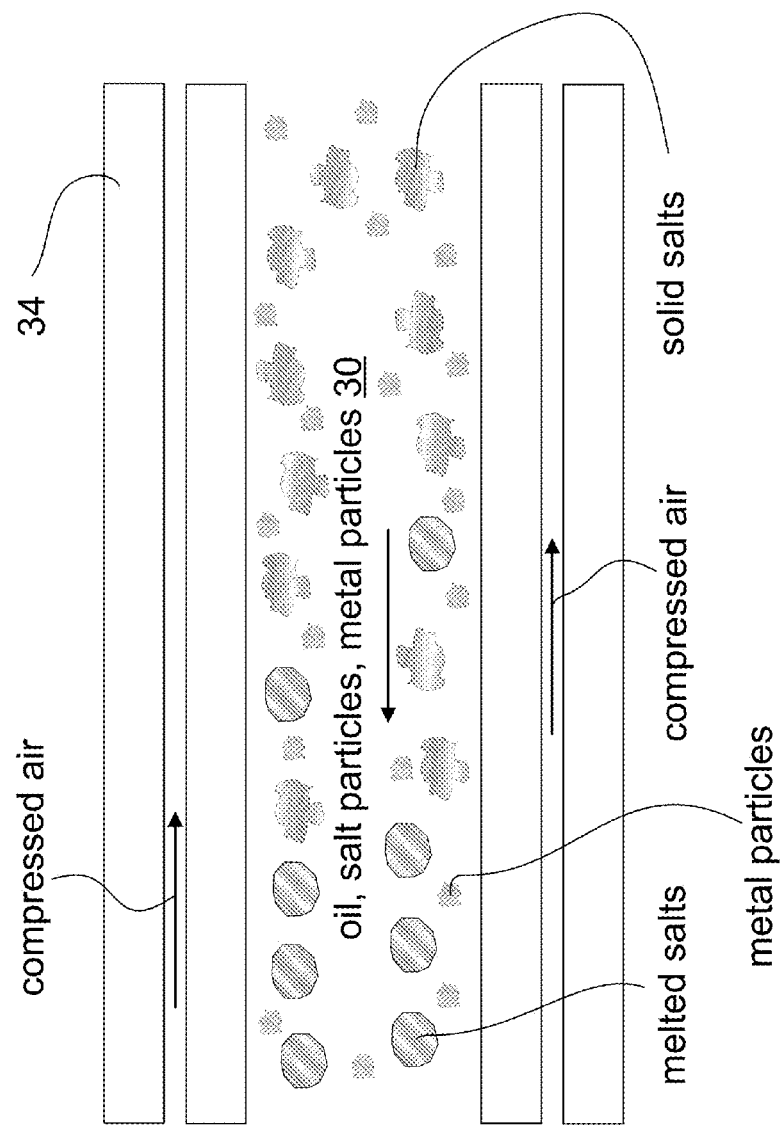
FIG. 5 is a schematic, sectional view illustrating a portion of a heat exchanger having compressed air passing in steel tubes with a heat exchange fluid of an oil, salt particle and metal particle mixture according to one embodiment.

FIG. 5 shows an embodiment of a heat transfer fluid 30 flowing between small bore tubes 34 of a heat exchanger. The fluid 30 can be any liquid to transport sensible heat to a storage tank that contains latent heat storage material. However, in the embodiment of FIG. 5, there is shown a heat transfer fluid that is a mixture or suspension of oil and salt particles, the latter melting during the heat absorption process and solidifying during heat recovery. Preferably, the mixture also contains metal particles, such as a good conductor like copper, to improve heat transfer. Because the fluid is a mixture with the oil surrounding the salt and metallic particles, the salt particles do not agglomerate, and thus do not cause any flow problems. Any flowable media that contains particles of latent heat material that do not agglomerate can be suitable.

The advantage of providing the latent heat material in proximity to the tubes is that most of the heat transfer takes place with the particles of latent heat material, and by making the particles of latent heat material flowable, there is a very good ability to improve contact and heat transfer by fluid flow that transports the latent heat material particles. In the case of salt particles in oil, as an example, the oil need not transfer the heat from the tubes very far before the heat can be transferred to the phase change of the salt.

The heat transfer fluid required could be a heat transfer fluid mixtures as listed in tables 2 and 3. Table 2 provides examples of ranges for the different components of a heat transfer fluid composition of the fluid. Tables 3 and 4 provides example of specific heat transfer fluid compositions. This composition has a heat capacity of between about 2 and $4 \times 10^3$ j/g between −40° C. and 300° C. and a viscosity of about 1 cP to about 400 cP.

TABLE 2

| Global mixture Weight basis (g/g) | salt mixture Weight basis g/g | components |
|---|---|---|
| 20-40% | 20-26% | Lithium nitrate |
| | 10-18% | Sodium nitrate |
| | 10-16% | Potassium nitrate |
| | 28-42% | Potassium nitrite |
| | 8-16% | Calcium nitrate |
| 55-70% | | Polymethyl Phenyl Siloxane Fluid |
| 55-70% | | Synthetic Heat Transfer Fluid |
| 5-15% | | copper particles |

TABLE 3

| Composition | Composition Type | Mass fraction |
|---|---|---|
| Oil (A) | Synthetic Heat Transfer Fluid | 60% |
| Salts | M1 | 25% |
| Metallic Particles | 0.5 μm copper | 15% |

TABLE 4

Mixture of salts used in experiments M1

| Salt type | Chemical formula | Mass fraction (g/g) |
|---|---|---|
| Lithium nitrate | LiNO3 | 26% |
| Sodium Nitrate | NaNO3 | 18% |
| Potassium nitrate | KNO3 | 56% |

Figure 6:
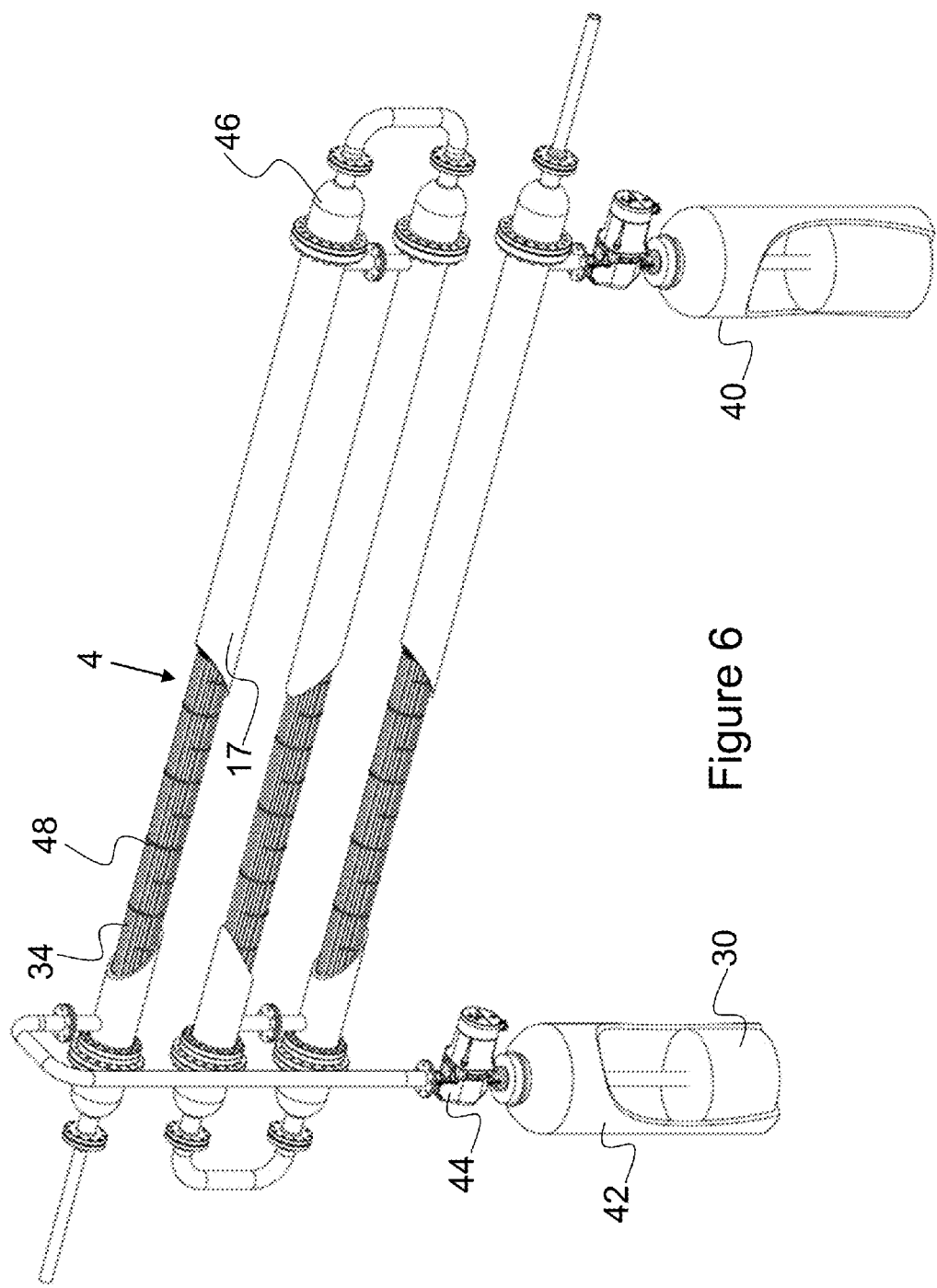
FIG. 6 is a partly break away isometric view of a three section heat exchanger and heat transfer fluid reservoir system.

FIG. 6 illustrates a heat exchanger subsystem 4 having three calendar type heat exchangers 17, each having a number of tubes 34 supported in supports 48 and interconnecting compressed air plenums or heads 46. Heat exchange fluid 30 passes over the outside of the tubes 34 between the heads 46 from end to end of each of the exchangers 17 from a first reservoir 40 to a second reservoir 42 with the help of a pump 44. The tube supports 48 (better illustrated in FIG. 7) can work as baffles to force the circulation of the heat transfer fluid laterally across the tubes in a kind of zigzag manner, rather than simply along the tubes, to improve contact and heat transfer.

As a mere example, about 70 tubes 34 can be arranged within each calendar type heat exchanger 17, as illustrated in FIG. 7. Each tube 34 can be made of Stainless Steel SS316L grade steel, have an inner diameter of 3.81 mm and outer diameter of 6.35 mm and 1.245 mm of thickness, with a length of 177.8 cm. The inner diameter can vary from 2.5 to 4.5 mm, while the thickness can vary from 0.7 to 2 mm. Three such exchangers 17 are sufficient to provide a heat transfer rate of 500 kilowatts when using a suitable heat transfer fluid 30 as described above. To store 1 MWh of heat, a volume of approximately 625 liters (160 US gallons) of such suitable heat transfer fluid is required.

FIG. 8 illustrates a power grid transmission network enhanced with CAES network node systems 78. A simulator 70, as is known in the art, determines the stability of the power transmission network based on current and project supply and load conditions, received in part using network sensors 72. The information provided by conventional simulators is used to manage a power transmission and distribution network, with a view to prevent failure, i.e. a brown- and/or black out. It can also be used to reduce power transmission losses.

While the determination of what action is required to balance or stabilize a network can be done by an experienced operator with the help of the simulator 70, a power balancing calculator, namely computer software running on a processor, can be used to suggest the appropriate load or power supply adjustments that would be favorable to network stability and efficiency. A controller 76 can use operator input, or input from the calculator 74, to send control signals via a telecommunications network to the network node CAES units 78. In the case of synchronous AC networks, the control signal can provide the CAES systems 78 with their specific phases to inject into the network to help with stabilization.

As schematically illustrated, a CAES system 78 can be a mobile unit transportable by truck or rail. With the following approximate specifications, an example of a CAES mobile system can fit within a conventional tractor-trailer/rail car shipping container and have an approximate total container weight of about 16,000 kg:

Compressor motor power—600×4 kW;
case 1 (300 cfm): 1×75 HP (screw compressor)+1×100 HP (booster compressor)
case 2 (1200 cfm): 2×150 HP (screw compressor)+2×200 HP (booster compressor)
Generator power output—500 kW;
Weight of air turbine and generator—2200 kg;
Weight of heat transfer fluid 30-2000 kg/500 kW;
Heat storage capacity of fluid 30-750 kW/m$^3$;
Maximum compressed air storage pressure—450 bars;
Weight of compressed air storage tanks—3950 kg/m$^3$;
Weight of heat exchangers—195 Kg/shell (585 Kg for 3 shells)
Power storage capacity—2 MWh The ability to absorb 2.4 MW of power at a given node can be used to stabilize a power transmission network. If such stabilization is not required, "recharging" of CAES systems can be done during off-peak times, such as between 1 AM and 5 AM. The ability to provide power to specific nodes in a power transmission network is of great value to stabilizing power flow among transmission lines.

The CAES system can thus be operated without any problems even when operating in very rough climates, and does not require any special location. An automated system to control the operation of the CAES system is provided (not shown in the Figures) to control the various valves, pressure and flow regulators, motors, generators and/or heaters, as would be readily apparent to a person skilled in the art. Furthermore, the flexibility to change the pressure gradient (P2-Patm) gives a control over the rotational speeds of the air turbine and the generator, which saves the cost of other components.

The CAES system allows power to be produced without any kind of combustion or use of fossil energy sources. When the goal is long term power storage, compressed air tanks can be added and/or the storage pressure of the gas can be increased. In a scenario where a CAES isothermal system is used, increasing pressure in the compressed air tanks leads to considerable heat loss, which reduces the efficiency. In the substantially adiabatic CAES system using the recovery of the heat, as illustrated in FIGS. 1 and 2, longer-term power storage with better efficiency is provided.

The exemplary embodiments described above on the one hand illustrate the high degree of operational flexibility of the power storage station according to the invention. It is also clear that the applied resources are utilized better than in the case of power storage stations that are known in the prior art. In particular, the above embodiments provide a way to efficiently absorb and restore heat from and to compressed air for storage at ambient temperature conditions by exchanging heat at high pressure and using high pressure storage.

What is claimed is:

1. A compressed air energy storage and recovery system comprising:
   a compressed air tank structured to store compressed air above 225 bars;
   a heat storage unit containing a heat transfer fluid; and
   a heat exchanger structured to withstand pressures of compressed air above 225 bars and to receive a low flow and high density of said compressed air above 225 bars, wherein said heat exchanger is connected on one side to the compressed air tank and connectable to an air compressor and an air motor, and on another side receiving said heat transfer fluid from a cold conduit of the heat storage unit and from a hot conduit of the heat storage unit, the heat exchanger configured to extract heat from said compressed air for storage and to heat said compressed air from said tank prior to expansion and use to recover energy in the air motor,
wherein said heat exchanger comprises a number of tubes arranged to conduct said compressed air in parallel, wherein said tubes are made of stainless steel and have an inner diameter from 2.5 mm to 4.5 mm, and a thickness from 0.7 mm to 2 mm.

2. The system as defined in claim 1, wherein said compressed air tank is structured to store compressed air above 275 bars.

3. The system as defined in claim 1, wherein said heat transfer fluid contains a mixture comprising a liquid and particles of a latent heat storage material.

4. The system as defined in claim 3, wherein said mixture comprises oil and salt particles.

5. The system as defined in claim 4, wherein said mixture further comprises metal particles.

6. The system as defined in claim 1, wherein said heat storage unit comprises a first reservoir of cool heat transfer fluid, a second reservoir of hot heat transfer fluid, and at least one circulation pump.

7. The system as defined in claim 1, further comprising an external heating element for providing heat to said heat storage unit.

8. The system as defined in claim 7, wherein said heating element is an electrical resistive heating element.

9. The system as defined in claim 1, further comprising at least one air compressor, wherein said at least one air compressor comprises said air compressor to which said heat exchanger is connectable thereto, configured to compress ambient air to a pressure for storage in said air tank.

10. The system as defined in claim 9, wherein said at least one compressor comprise at least two stages of compression, said heat exchanger comprising separate heat exchanger components for compressed air from each said stage of compression.

11. The system as defined in claim 9, wherein said at least one compressor comprise a single stage of compression.

12. The system as defined in claim 9, wherein said heat exchanger and said heat storage unit with said heat transfer fluid are configured to have a reverse flow and to absorb and to return more than 80% of the heat energy originally present in compressed air from said at least one air compressor.

13. The system as defined in claim 1, further comprising:
a working pressure reservoir;
a pressure regulator connecting said heat exchanger to said working pressure reservoir and configured to maintain a predetermined pressure in said working pressure reservoir; and
said air motor connected to an electric generator, connected to said working pressure reservoir.

14. The system as defined in claim 1, further comprising an air dehumidification unit configured to remove moisture from said compressed air.

15. A power transmission network comprising:
at least one compressed air energy storage and recovery system as defined in claim 1 and connected to a node of said network for absorbing and releasing electric power in response to a remote control signal;
a remote controller connected to said compressed air system energy storage and recovery system via a communications system and configured to provide said remote control signal.

16. A method of compressed air energy storage and regeneration comprising:
using a first energy source to compress air to a pressure above 225 bar;
using a heat exchanger comprising a number of tubes arranged to conduct said compressed air in parallel, wherein said tubes are made of stainless steel and have an inner diameter from 2.5 mm to 4.5 mm, and a thickness from 0.7 mm to 2 mm, to absorb heat from said air above 225 bar;
storing said absorbed heat in a latent heat storage medium;
storing said compressed air in at least one storage vessel;
using said heat exchanger to provide heat to said compressed air, compressed to over 225 bar, for regeneration of energy;
expanding said compressed air from said storage vessel to provide expanded air for regeneration of energy; and
generating power from said expanded and heated air.

17. The method as claimed in claim 16, wherein said air is compressed above 250 bar.

\* \* \* \* \*